Figure 1:
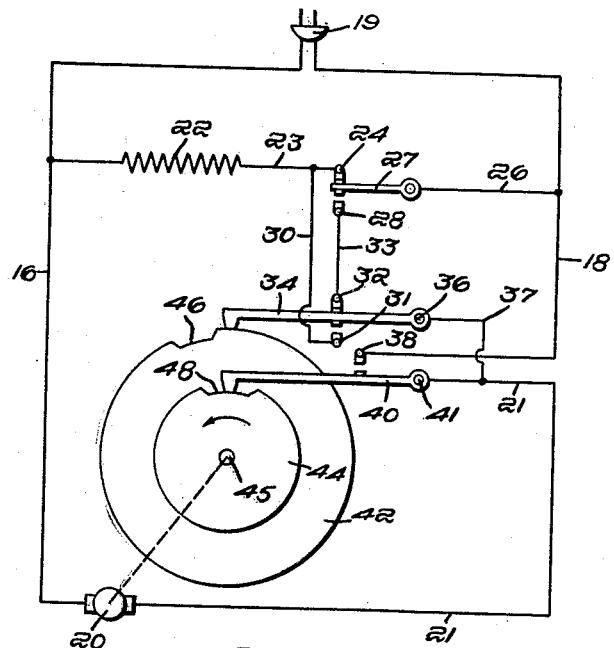

Oct. 2, 1945.   G. SMITH   2,386,009
ELECTRIC COOKING APPARATUS
Filed Jan. 7, 1943   2 Sheets-Sheet 1

Inventor:
Graydon Smith,
by Kenway & Witter
Attorneys

Oct. 2, 1945.　　　　　　G. SMITH　　　　　2,386,009
ELECTRIC COOKING APPARATUS
Filed Jan. 7, 1943　　　　2 Sheets-Sheet 2
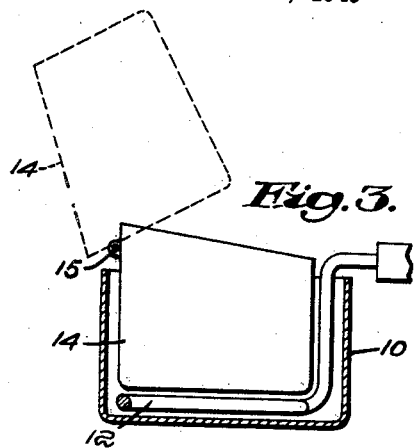
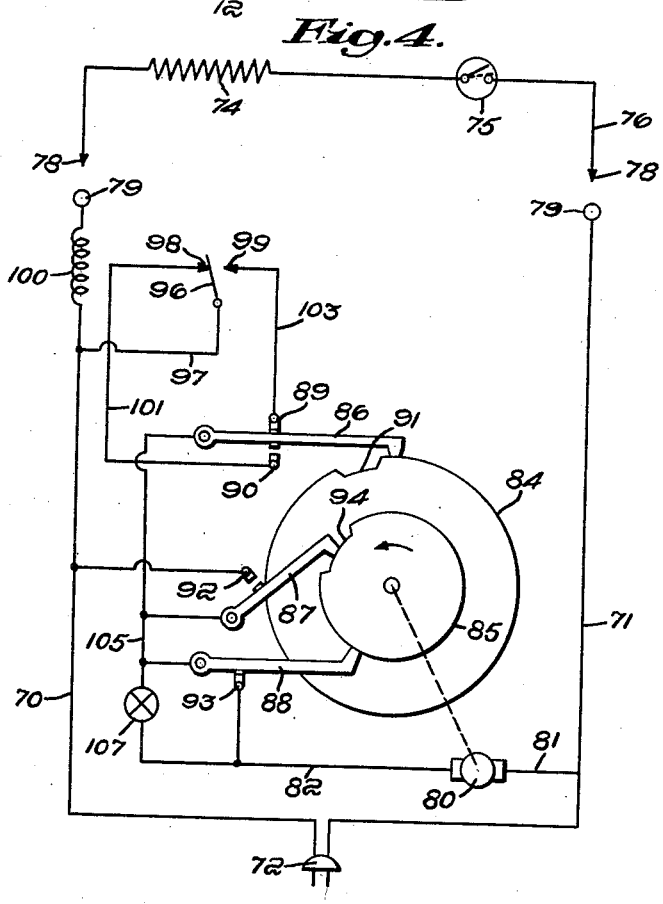

Patented Oct. 2, 1945

2,386,009

UNITED STATES PATENT OFFICE 2,386,009

ELECTRIC COOKING APPARATUS

Graydon Smith, Concord, Mass., assignor to Electricooker, Inc., Newburyport, Mass., a corporation of Massachusetts Application January 7, 1943, Serial No. 471,590

10 Claims. (Cl. 219—20)

This invention relates to electric cooking apparatus in which successive batches of a product to be treated or cooked are submerged in an electrically heated bath and removed therefrom after a predetermined cooking, the operation being fully automatic in the treatment of successive batches or semi-automatic in the treatment of individual batches, and the primary object of the invention resides in the production of improved means for automatically controlling the sequence of operations.

In Reissue Patent No. 20,570 is disclosed a fully automatic cooking machine of the type above referred to and Patents Nos. 2,215,929 and 2,222,314 disclose similar semi-automatic cooking machines. All these machines employ an electric motor for carrying the product to and from the cooking bath, a heating coil for heating the cooking bath, and an electric circuit together with a thermostat and other automatic means for controlling the operation of the motor and heating coil through a predetermined cycle. Operation of the motor throughout this cycle in these machines is dependent upon the thermostat. One object of my invention resides in the production of an improved apparatus of this nature embodying an auxiliary motor circuit and means for so interlocking the motor and thermostat that the operation of the motor throughout the major portion of the cycle is independent of the thermostat whereby improving the machine and facilitating its operation as hereinafter described.

The semi-automatic machines above referred to employ latch mechanisms for holding in raised position each cooked batch as it is raised from the cooking bath. A further object of my invention resides in the production of an improved apparatus which dispenses with the necessity for such mechanisms whereby not only simplifying and improving the machine and its operation but furthermore removing a dangerous hazard presented by the latch mechanism, all as hereinafter described.

It is highly desirable that machines of this nature shall be so constructed that they can be frequently and conveniently disassembled and thoroughly cleaned, and another object of the invention resides in the production of an improved cooking machine in which the heating coil together with the thermostat can be conveniently removed as a unit.

A further feature of the invention consists in the production of a novel cooking machine of this nature which can be optionally operated either as a fully automatic machine or as a semi-automatic machine, the change from one to the other requiring only the opening or closing of a switch.

Figure 2:
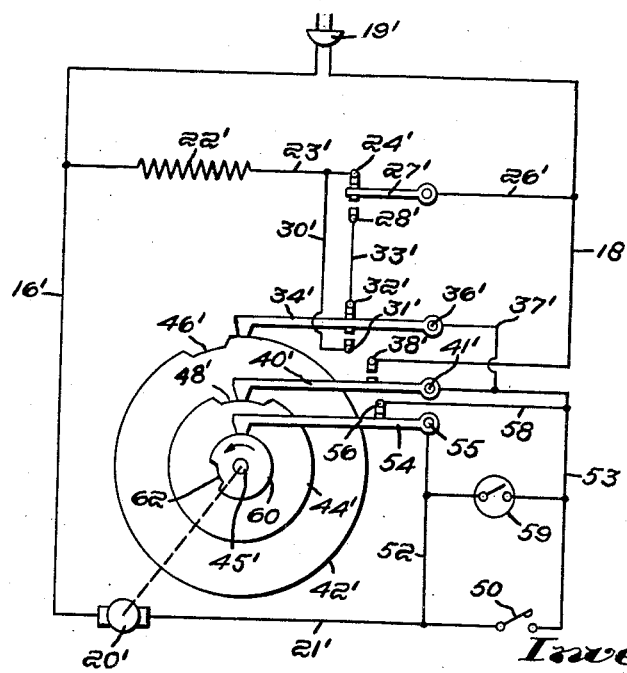

These and other features of the invention will be best understood and appreciated from the following description of preferred embodiments thereof selected for purposes of illustration and shown in the accompanying drawings in which Figure 1 is a diagram of an electrical circuit and cooperating mechanism adapted to be associated with the cooking apparatus, Figure 2 is the diagram of Figure 1 somewhat modified, Figure 3 is a fragmentary view of a cooking apparatus, Figure 4 is a modified form of diagram.

My invention relates to machines for heat treating or cooking various products, particularly edibles, and more especially concerns a novel electrical circuit and cooperating mechanism for automatically controlling such machines. A cooking apparatus of this nature ordinarily includes a container 10 for holding the cooking bath and an electrically operating element 12 for heating the bath. The product to be cooked is most commonly in mass form requiring a basket or the like for holding batches of the product during the treatment. In Figure 3 of the drawings I have illustrated such a basket 14 pivoted at 15 for movement into and out of the cooking bath. It will be understood that this structure is disclosed herein merely by way of illustration.

In Figure 1 I have illustrated an electric circuit and cooperating mechanism adapted automatically to operate cooking or heat treating apparatus of the general nature above described. This circuit has leads 16 and 18 connected to a contact plug 19. The lead 16 is connected to one terminal of a motor 20 having a wire 21 connected to its other terminal, the wire 21 being at times connected to the lead 18 through switches as hereinafter described. A heating coil 22 or equivalent heating element is in a lead 23 connected to the wire 16 at one end of the coil and to a switch contact 24 at the other end of the coil. A wire 26 from the lead 16 is connected to a thermostatically operated switch arm 27 located between and cooperating with the contact 24 and an opposing contact 28.

A wire 30 from the lead 23 is connected to a switch contact 31 opposite to a switch contact 32 connected by a wire 33 to the contact 28. A switch arm 34 pivoted at 36 is located between the contacts 31 and 32 and is connected by a wire 37 to the wire 21. The lead 18 is connected to a contact 38 adapted to cooperate with a switch arm 40 pivoted at 41 and connected to the wire 21.

Cooperating with the switch arms 34 and 40 are two discs 42 and 44 fixed to a shaft 45 driven at reduced speed from the motor 20. The free ends of the switch arms are arranged to ride on the peripheries of the discs and respectively to drop into notches 46 and 48 formed in the discs when such notches are brought to positions beneath the free ends of the arms.

The circuit and its operating mechanism are adapted automatically to operate a cooking apparatus through a predetermined cycle at each complete rotation of the discs 42 and 44. When the cooking apparatus is of the nature illustrated in Figure 3, this cycle consists in permitting the basket to remain in the cooking bath for a predetermined cooking of the product contained therein, then pivoting of the basket to the broken line position in which the cooked product is discharged, and the return of the basket to the bath and during which a new batch to be cooked is deposited into the basket. The sequence of operations performed by the circuit and mechanism illustrated in Figure 1 will now be described.

As illustrated in Figure 1, the thermostatic switch arm 27 is in engagement with the contact 24 and the heating coil is providing heat to the bath, the motor being idle. This position represents the cooking period. The thermostat is under the control of heat from the bath and when the bath reaches a predetermined temperature the cooking is completed and the thermostat moves the switch arm 27 downwardly, thus breaking the heating coil circuit contact at 24 and making contact at 28. The following circuit is thereupon established through the motor: lead 16, motor 20, wires 21 and 37, arm 34, contact 32, wire 33, contact 28, arm 27, wire 26 and lead 18. The motor thereupon rotates the discs in the direction of the arrow. Such rotation of the disc 44 through a few degrees raises its switch arm 40 to a position making contact at 38 which thereupon establishes the following auxiliary circuit through the motor: lead 16, motor 20, wire 21, arm 40, contact 38, lead 18. It will be apparent that this circuit is wholly independent of the position of the thermostatically operated switch arm 27.

The motor continues to rotate the discs until the arms 34 and 40 again drop into their notches 46 and 48, this period corresponding to the raising of the basket from and returning it to the bath. Dropping of the arms 34 and 40 open both motor circuits at 31—32 and 38—60. The motor thereupon stops with the basket together with its fresh charge immersed in the bath which, normally remaining at substantially cooking temperature, keeps the thermostatically operated arm 27 in the down position. When the new batch has cooled the bath sufficiently, the thermostat raises the arm 27 to the position of Figure 1 whereby reestablishing the heating circuit. This movement of the arm 27 also establishes the following circuit through the motor: lead 16, motor 20, wires 21 and 37, arm 34, contact 31, wire 30, contact 24, arm 27, wire 26 and lead 18. The motor thereupon rotates the discs 42 and 44 until the arm 34 is raised from its notch 46 to the position of Figure 1 in which position the motor circuit is opened when the arm 34 leaves the contact 31. All motor circuits are now open and the cooking period ensues.

It will be noted that the motor circuit includes two parallel branches 30 and 33 and the contacts 24—31 and 28—32 therein. When the thermostat opens the heating coil circuit the arm 27 engages the contact 28 and closes the motor circuit through the branch 33 and its contact 32. Dropping of the arm 34 into the notch 46 breaks the contact at 32 and closes the contact at 31. Rotation of the disk 42 to the position of Figure 1 lifts the arm 34 from the notch 46 whereby breaking the contact at 31 and closing the contact at 32.

It will be apparent that, except for the auxiliary circuit above defined and operating through the contacts 38—40, the continued operation of the motor through the major portion of the cycle, during which the basket is raised from and returned to the cooking bath, would depend upon the position of the thermostatically operated arm 27. In such case any opening of the switch 27 from its contact 28 would cause the motor to stop before the basket is fully returned to the bath. My improved construction, including the auxiliary motor circuit, precludes any such possible break in the cycle.

The circuit and mechanism illustrated in Figure 1 and above described is adapted to a fully automatic machine in which successive batches of the product are cooked automatically without the attendance of an operator. In some cases it is desirable that the machine shall operate semi-automatically, i. e. cook individual batches only, the operator being required to restart the machine after each batch has been cooked and removed from the cooking bath. In such case the hopper, which normally serves in the fully automatic machine to deposit measured quantities of the uncooked product in the basket, can be closed and the operator can manually deposit in the basket such other product as he desires to cook. The circuit and mechanism illustrated in Figure 2 is adapted to be operated either fully automatically or semi-automatically.

The circuit and mechanism illustrated in Figure 2 substantially duplicates that shown in Figure 1 and furthermore includes additional parts rendering the machine either fully automatic or semi-automatic at the will of the operator. The parts corresponding to those shown in Figure 1 are indicated by the same reference characters primed and therefore need not be here repeated.

A manually operated switch 50 is placed in the motor circuit. When this switch is closed the fully automatic circuit is established and the operation is the same as that above described in connection with Figure 1. The placing of this switch 50 in the open position adapts the machine to semi-automatic operation.

A lead 52 from the wire 21' is connected to an arm 54 pivoted at 55 and having a contact adapted to engage an opposing contact 56 when the arm is in raised position. A wire 58 from the contact 56 is connected to a wire 53, and a shunt connection including a normally open push button switch 59 is interposed between the wires 52 and 53. It will be noted that the three switches 50, 56 and 59 are in three parallel branches in the motor circuit. The free end of the arm 54 rides on the periphery of a third disc 60 notched at 62. The sequence of operations performed by this circuit and mechanism when the switch 50 is open will now be described.

When the parts are in the position illustrated in Figure 2 the thermostatic switch arm 27' is in engagement with the contact 24' and the heating coil is providing heat to the cooking bath, the motor being idle. This position represents the cooking period. When the bath reaches the predetermined temperature at which the cooking of the product is completed, the thermostat moves the switch arm 27' downwardly, thus breaking the heating coil circuit contact at 24' and making contact at 28'. The following circuit is thereupon established through the motor: lead 16', motor 20', wires 21' and 52, arm 54, contact 56, wires 58, 53 and 37', arm 34', contact 32', wire 33', contact 28, arm 28', wire 26' and lead 18'. The motor thereupon rotates the discs in the direction of the arrow. The disc 44' immediately closes the auxiliary motor circuit through the contacts 38'—40' as above described. The motor continues to rotate the disks until the arm 54 drops into the notch 62 whereby breaking the motor circuit at 54—56. The motor thereupon stops, the notch 62 being so located that the basket has discharged its cooked load and remains in the raised position ready to receive a fresh load.

When the operator has deposited in the basket a fresh load of the product to be cooked, he restarts the machine by closing the push-button switch 59. This establishes a circuit through the motor and the operator holds the switch closed until the arm 54 is again lifted to its raised position and in which position the motor circuit through the contacts 54—56 is re-established. The machine thereupon continues its operation until the arms 34' and 40' drop into notches 46' and 48'. From this point the operation is the same as above-described in connection with Figure 1. It will be apparent that the contacts 38' and 40' in the auxiliary motor circuit remain closed even though the basket is held in raised position for a period permitting the bath to cool and move the arm 27' to the position of Figure 2. Thus the closing of the push button switch 59 is adapted to restart the motor independently of the thermostatically operated switch 27'.

The circuit and mechanism illustrated in Figure 4 functions substantially like that shown in Figure 2, but the structural arrangement provides certain advantages among which is the placing of the heating coil and thermostat in series in a line having two detachable terminals adapting these elements to be readily removed from the machine as a unit for easy cleaning. The circuit has leads 70 and 71 connected to a contact plug 72. A heating coil 74 and a thermostatically operated switch 75 are in series in a line 76 having two plug terminals 78 adapted to contact the leads 70 and 71 at 79. A motor 80 has one terminal 81 connected to the lead 71 and its other terminal 82 is adapted to be connected to the lead 70 through switches now to be described.

Driven at reduced speed from the motor are two discs 84 and 85. A pivoted switch arm 86 rests on the periphery of the disc 84 and two pivoted switch arms 87 and 88 rest on the periphery of the disc 85. The arm 86 cooperates with two contacts 89 and 90, being engaged with the contact 89 when in raised position and with contact 90 when in the down position in a notch 91 in the disc 84. The arms 87 and 88 cooperate respectively with two contacts 92 and 93 being engaged therewith when the arm is on the periphery of the disc 85 and disengaged therefrom when the arm drops into a notch 94 in the disc.

A pivoted switch arm 96 connected to the lead 70 by a wire 97 is located between and cooperates with two contacts 98 and 99, being normally in engagement with the contact 99. A relay coil 100 in the lead 70 cooperates with the arm 96 to hold it in engagement with the contact 98 when the coil is energized. A wire 101 connects the contacts 90 and 98 and a wire 103 connects the contacts 89 and 99. The three pivoted arms 86, 87, and 88 are connected together by a wire 105, and the wires 105 and 82 are adapted to be connected by a normally open push button switch 107 located therebetween. The switches 93 and 107 are in two parallel branches in the motor circuit.

The operation of this circuit and mechanism is substantially as follows, the terminals 78 and 79 being engaged and the plug 72 being connected with a source of electrical supply. As illustrated, the parts are in the cooking position, the thermostatic switch 75 being in closed position energizing the heating coil which is supplying heat to the cooking bath, and the switch arm 96 being held in engagement with the contact 98 by the energized coil 100. During this cooking period all motor circuits are open.

When the cooking bath reaches the predetermined temperature at which the batch is cooked, the thermostatic switch 75 automatically opens thereby opening the circuit through the coils 74 and 100. The switch arm 96 thereupon engages the contact 99 and establishes the following circuit through the motor: lead 70, wire 97, arm 96, contact 99, wire 103, contact 89, arm 86, wire 105, arm 88, contact 93, wire 82, motor 80, wire 81 and lead 71. The motor thereupon rotates the discs 84 and 85 in the direction of the arrow. Shortly thereafter the disc 85 raises the arm 87 and establishes the following auxiliary circuit through the motor; lead 70, contact 92, arm 87, wire 105, arm 88, contact 93, wire 82, motor 80, wire 81 and lead 71. The motor continues to operate until the arm 88 drops into the notch 94 whereby breaking the motor circuit at 93. In this position the basket has been raised from the bath, its cooked load discharged and the basket stopped in position to receive a new load.

The operator can now deposit in the basket a fresh supply to be cooked and the depressing of the push button 107 then reestablishes the circuit through the motor which thereupon continues its operation until the arms 86 and 87 drop into the notches 91 and 94. This movement of these arms opens all motor circuits and leaves the basket immersed in the cooking bath. When the bath cools sufficiently, either by the immersion of the new batch thereinto or otherwise, the thermostatic switch 75 automatically closes whereby energizing the heating coil 74 and the relay coil 100. The latter thereupon draws the switch arm 96 into engagement with the contact 98 whereby establishing the following motor circuit: lead 70, wire 97, arm 96, contact 98, wire 101, contact 90, arm 86, wire 105, arm 88, contact 93, wire 82, motor 80, wire 81 and lead 71. The motor thereupon operates until the arm 86 is raised to the position illustrated, whereby breaking the motor circuit at contact 90. The cooking period now ensues. It will be apparent that this circuit can be made to operate fully automatically by holding the push button switch 107 permanently closed, and this switch can be so designed that it can be normally in open position or placed in fixed closed position.

It is particularly noted that the improved circuit and mechanism herein disclosed, when applied to a semi-automatic cooking apparatus of the type disclosed in Patents 2,215,929 and 2,222,314, entirely eliminates the necessity for latch mechanisms and the like for holding the basket in raised position, thereby not only effecting an economy of construction but also eliminating possibility of the basket inadvertently dropping into the hot bath and causing burns to the operator. It is also noted that in all forms of the invention the thermostat operates in conjunction with switch means to close a circuit through the motor when the thermostat opens the heating coil circuit, the thermostat being mechanically associated with this switching means in Figures 1 and 2 and operating in conjunction with the switch means through the relay coil 100 in Figure 4.

Having thus described my invention what I claim as new and desire to secure by Letters Patents of the United States is:

1. In an electric cooking apparatus, means for holding a cooking bath, a circuit having a heating coil arranged to heat the bath, an electric motor, a thermostat and cooperating switch under the control of heat from the bath arranged to close the heating coil circuit when the bath is cooled to a predetermined temperature and to open the heating coil circuit when the bath reaches a higher predetermined temperature, switch means operative in conjunction with said cooperating switch to close a circuit through the motor when the thermostat opens the heating coil circuit, means including an element driven by the motor for thereafter closing through the motor an auxiliary circuit independent of the thermostat, and means for bringing both motor circuits to open position after predetermined operation of the motor.

2. The apparatus defined in claim 1 plus a switch under the control of the motor for automatically interrupting the flow of electric current to the motor through a minor part of the cycle prior to said opening of both motor circuits, and means including a manually operated switch for bridging the last-named switch.

3. The apparatus defined in claim 1 plus a switch under the control of the motor for automatically interrupting the flow of electric current to the motor through a minor part of the cycle prior to said opening of both motor circuits, and means including manually operated switch means for bridging the last named switch, said switch means being constructed to be placed in either a closed position continuously bridging said last named switch without manual effort or a normally open position requiring manual effort to hold it closed.

4. The apparatus defined in claim 1 plus a second auxiliary circuit cooperating with said motor circuits, a switch in the second auxiliary circuit, means under the control of the motor for automatically opening the switch and stopping the motor prior to the opening of the first two motor circuits, means for manually establishing a circuit through the motor, and means operated by the motor for thereafter closing the last-named switch.

5. The apparatus defined in claim 1 plus two parallel branches in the motor circuit, a manually operated switch in one branch, an automatically operated switch in the other branch, means under the control of the motor for automatically opening the automatically operated switch and stopping the motor prior to the opening of the first two motor circuits when the manually operated switch is in the open position, the motor being adapted to be restarted by manually establishing a circuit therethrough, and means operated by the motor for thereafter closing said automatically operated switch.

6. In an electric cooking apparatus, means for holding a cooking bath, a circuit having a heating coil arranged to heat the bath, an electric motor, a thermostat and cooperating switch under the control of heat from the bath arranged to close the heating coil circuit when the bath is cooled to a predetermined temperature and to open the heating coil circuit when the bath reaches a higher predetermined temperature, a motor circuit including two parallel branches and switch contacts therein, switch means operative in conjunction with said cooperating switch to close the motor circuit through one of said branches and a contact therein when the thermostat opens the heating coil circuit, means for bringing the motor circuit to open position after predetermined operation of the motor, and means driven by the motor for opening said contact in one branch and closing a contact in the other branch following the closing of the heating coil circuit by the thermostat.

7. In an electric cooking apparatus, means for holding a cooking bath, a circuit having a heating coil arranged to heat the bath, an electric motor, a thermostat and cooperating switch under the control of heat from the bath arranged to close the heating coil circuit when the bath is cooled to a predetermined temperature and to open the heating coil circuit when the bath reaches a higher predetermined temperature, a motor circuit including two parallel branches therein, switch means operative in conjunction with said cooperating switch to close the motor circuit through one of said branches when the thermostat opens the heating coil circuit, means including an element driven by the motor for closing through the motor an auxiliary circuit independent of the thermostat after said opening of the heating coil circuit, means for bringing both motor circuits to open position after predetermined operation of the motor, and means driven by the motor for opening the motor circuit through said one branch and closing a contact in the other branch following the closing of the heating coil circuit by the thermostat.

8. In an electric cooking apparatus, means for holding a cooking bath, a circuit having a heating coil arranged to heat the bath, an electric motor, a thermostat and cooperating switch under the control of heat from the bath arranged to close the heating coil circuit when the bath is cooled to a predetermined temperature and to open the heating coil circuit when the bath reaches a higher predetermined temperature, switch means operative in conjunction with said cooperating switch to close a circuit through the motor when the thermostat opens the heating coil circuit, means for opening the motor circuit after predetermined operation of the motor, a switch under the control of the motor for automatically interrupting the flow of electric current to the motor through a minor part of the cycle prior to said opening of the motor circuit, and means including a manually operated switch for bridging the last named switch.

9. In an electric cooking apparatus, means for holding a cooking bath, a circuit having a heating coil arranged to heat the bath, an electric motor, a thermostat and cooperating switch under the control of heat from the bath arranged to close the heating coil circuit when the bath is cooled to a predetermined temperature and to open the heating coil circuit when the bath reaches a higher predetermined temperature, switch means operative in conjunction with said cooperating switch to close a circuit through the motor when the thermostat opens the heating coil circuit, means for opening the motor circuit after predetermined operation of the motor, said circuit having two parallel branches therein, a manually operated switch in one branch, an automatically operated switch in the other branch, means under the control of the motor for automatically opening the automatically operated switch and stopping he motor prior to said opening of the motor circuit when the manually operated switch is in the open position, the motor being adapted to be re-started by manually establishing a circuit therethrough, and means operated by the motor for thereafter closing said automatically operated switch.

10. In an electric cooking apparatus, means for holding a cooking bath, a circuit having a heating coil arranged to heat the bath, an electric motor, a thermostat and cooperating switch under the control of heat from the bath arranged to close the heating coil circuit when the bath is cooled to a predetermined temperature and to open the heating coil circuit when the bath reaches a higher predetermined temperature, switch means operative in conjunction with said cooperating switch to close a circuit through the motor when the thermostat opens the heating coil circuit, and means for opening the motor circuit after a predetermined operation of the motor, said heating coil and thermostat being in series in a portion of the first named circuit and said portion of the circuit having two detachable terminal contacts at its ends adapting the heating coil and thermostat to be removed as a unit.

GRAYDON SMITH.